United States Patent [19]

Bayliss

[11] 4,396,097

[45] Aug. 2, 1983

[54] FRICTION POD MATERIAL ADJUSTER AND CONTINUOUS WEAR INDICATOR

[75] Inventor: John P. Bayliss, Redditch, England

[73] Assignee: Lucas Industries Limited, Birmingham, England

[21] Appl. No.: 229,302

[22] Filed: Jan. 28, 1981

[30] Foreign Application Priority Data

Feb. 1, 1980 [GB] United Kingdom ................ 8003535

[51] Int. Cl.³ .............................................. F16D 65/56
[52] U.S. Cl. ............................. 188/196 BA; 188/202; 188/196 V; 188/250 B
[58] Field of Search ................ 188/196 BA, 197, 202, 188/203, 1.11, 72.8, 71.9, 250 G, 250 B, 57, 196 V; 192/111 A, 111 B, 94; 116/208

[56] References Cited

U.S. PATENT DOCUMENTS

| 2,833,381 | 5/1958 | Frola et al. | 188/197 |
| 3,339,676 | 9/1967 | Quinn | 188/1.11 |
| 3,438,351 | 4/1969 | Kirkwood | 116/208 |
| 4,036,330 | 7/1977 | Henning et al. | 188/72.8 |
| 4,082,165 | 4/1978 | Harrison | 188/202 |
| 4,301,897 | 11/1981 | Cox | 188/196 B |

FOREIGN PATENT DOCUMENTS 980692  1/1965  United Kingdom ................ 116/208

Primary Examiner—George E. A. Halvosa
Assistant Examiner—Robert Oberleitner
Attorney, Agent, or Firm—Scrivener, Clarke, Scrivener and Johnson

[57] ABSTRACT

A vehicle wheel brake, particularly for a railway vehicle, has an elongate friction pad for engagement with a braking surface. In order to provide for adjustment of the pad without excessive length of the brake, the friction pad is hollow and an elongate adjuster member is located within the friction pad. Relative rotation of the pad and adjuster member, which occurs when there is excessive wear of the friction material, causes axial movement of the friction material to compensate for the wear.

7 Claims, 7 Drawing Figures

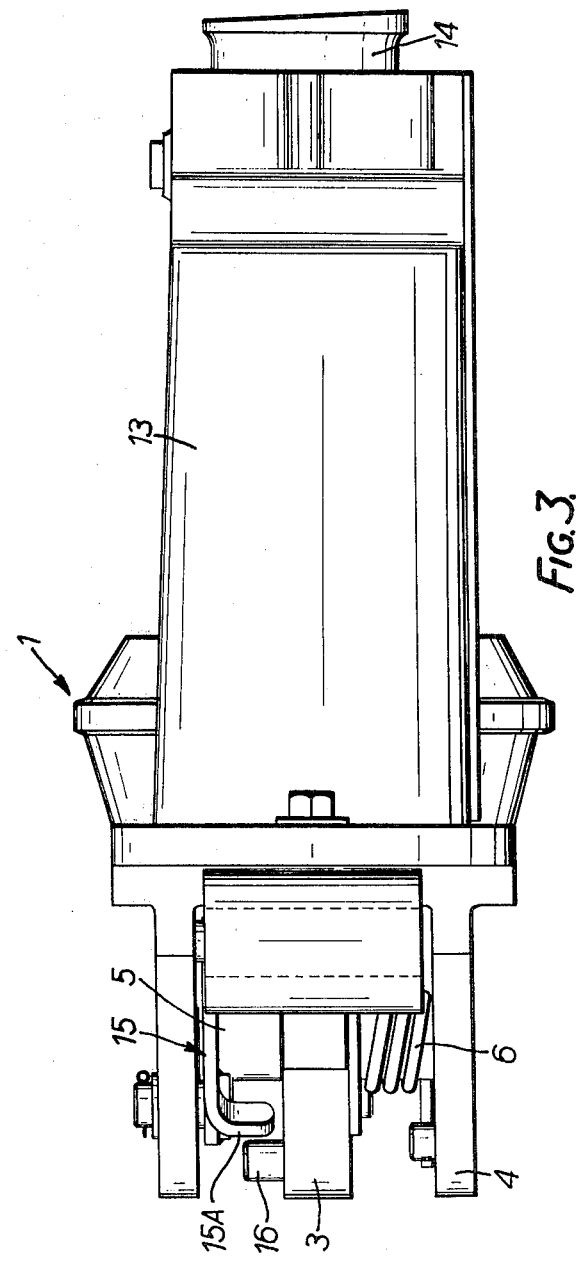

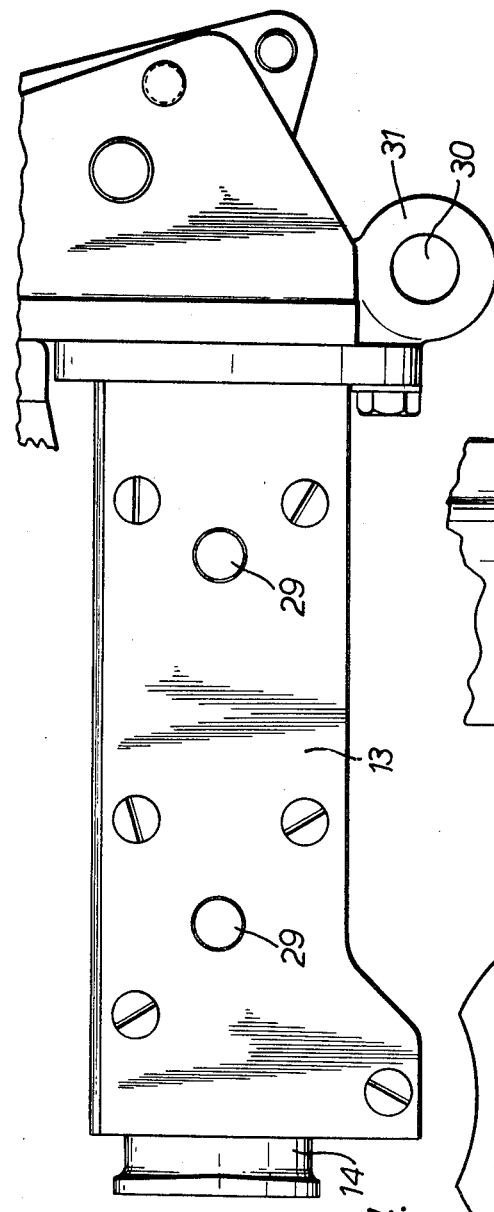
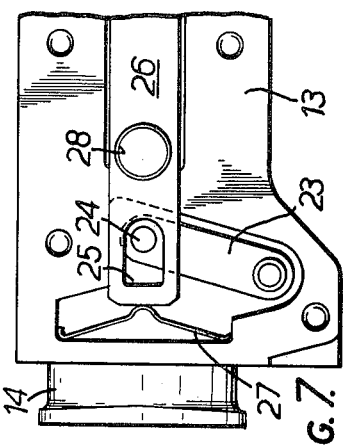
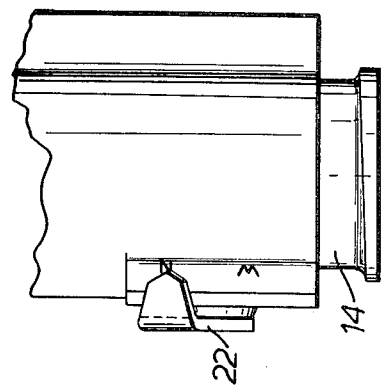
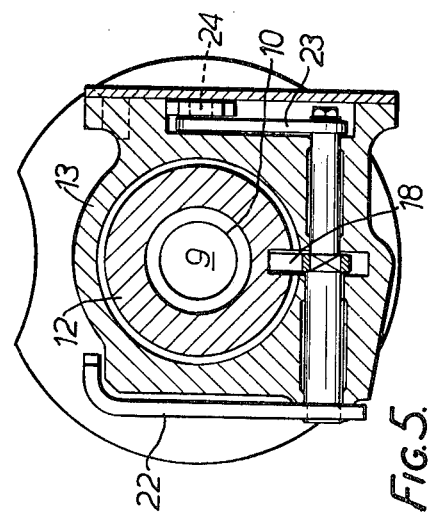

FRICTION POD MATERIAL ADJUSTER AND CONTINUOUS WEAR INDICATOR

This invention relates to vehicle wheel brakes.

Brakes have previously been proposed, particularly for use with railway vehicle wheels, which have elongate brake pads which avoid the necessity of frequently replacing the pads. However, adjustment of such brakes to compensate for wear of the pads has proved difficult since the travel of the adjuster has to be substantially the same as the pad length, so that to provide an adjuster behind the pad, which is common practice for non-elongate pads, results in a brake of excessive length, possibly too large for the vehicle. By "elongate" is meant a pad whose axial length in its unworn condition is substantially greater than any cross sectional dimension of the pad.

It has been previously proposed to overcome the problem of excessive brake length by providing an adjuster which lies at least partially alongside the brake pad, the adjuster having a transversely extending arm which engages the rear of the pad and is movable longitudinally of the brake. In this way, the length of the brake does not have to be substantially greater than the length of the pad.

One aim of the present invention is to provide a modified form of brake having elongate friction material.

In accordance with one aspect of the invention, there is provided a vehicle wheel brake comprising an elongate part of friction material and an adjuster having an elongate adjuster part, characterised in that one of the parts is hollow and the other part is located within the hollow part, the parts being axially relatively movable.

Preferably, the parts have a screw connection and are arranged for relative rotation. In the particular embodiment described in more detail below, the adjuster part is located within the part of friction material, and there is provided means for relatively rotating the parts when the wear of the friction material part is excessive.

Preferably, the friction material part has an elongate slot extending lengthwise of that part and into which a follower projects to prevent rotation of the friction material part. The follower is preferably connected to a wear indicator and the base of the slot is conveniently tapered from one end to the other so that longitudinal movement of the friction material part moves the follower in a sense to actuate the wear indicator.

Thus, in accordance with another aspect of the invention, there is provided a brake having an elongate pad of friction material, characterised in that the brake includes a wear indicator having a follower which extends into a longitudinal slot formed in the friction material, wherein the base of the slot tapers along its length and wherein the follower is rotatable and connected to an indicating member, the arrangement being such that as the follower moves along the slot it effects movement of the indicator.

A brake for a railway vehicle will now be described, by way of example, with reference to the accompanying drawings, in which:

FIG. 3 is a view from beneath of the brake,

FIG. 4 is a side view of the brake,

FIG. 5 is a sectional view taken on line V—V of FIG. 2 showing a brake wear indicator, FIG. 6 is a detail top plan view of the wear indicator of FIG. 5, and FIG. 7 is a detail side view of the wear indicator of FIG. 5.

Figure 1:
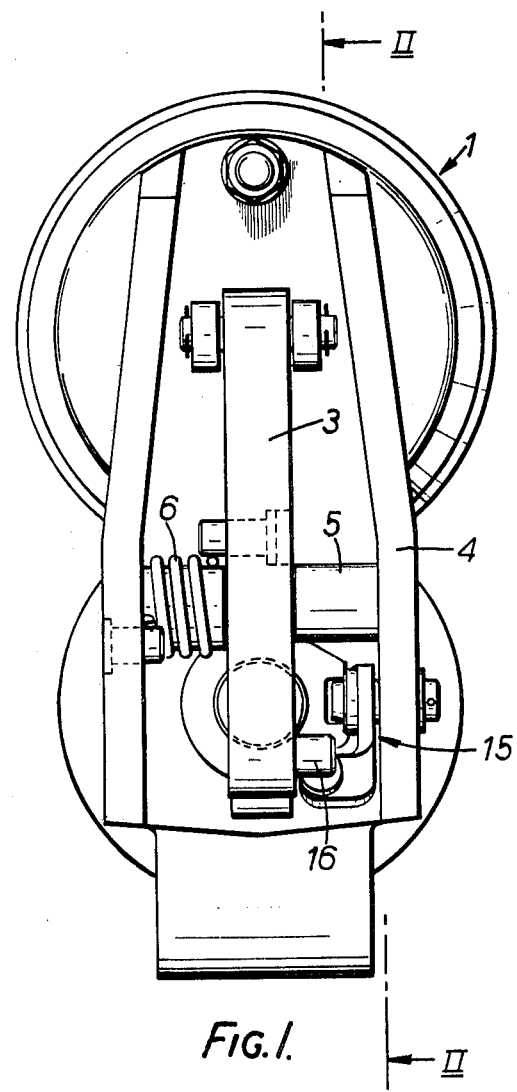
FIG. 1 is an end view of the brake.

The illustrated brake is intended to be mounted on a railway vehicle as described in the specification of our co-pending United States Patent Application Ser. No. 179,534 filed Aug. 19, 1980 to which attention is directed for a better understanding of the following description.

The brake comprises an actuator 1 having a push rod 2 connected to one end of a lever 3 which is pivotally attached to a frame 4 by a shaft 5. The lever 3 is biased to its illustrated neutral position by a torsion spring 6 surrounding the shaft 5. The other end of the lever 3 has a dome-shaped portion 3A which engages the end of an elongate brake shoe 8 to transfer braking forces to the brake shoe. One arm 7A of a U-shaped spring member 7 is secured to the inner end of the elongate brake shoe 8 and the other arm 7B engages the lever 3, so that the spring member 7 acts as both a shoe return spring and an anti-rattle device.

The brake shoe 8 comprises a central elongate core 9 having a threaded portion 10 on to which is secured a co-axial hollow elongate body of friction material 12 which extends beyond the threaded portion 10. Surrounding the friction material 12 is a housing 13 from which an end portion 14 of the material protrudes for engagement with the braking surface of a railway vehicle wheel (not shown). Thus, the shoe 8 is elongate in a direction extending away from the braking surface.

The brake has an adjusting device for compensating for wear of the friction material 12. The device comprises a bell-crank lever 15 pivotally connected to the frame 4 and having one arm 15A normally spaced from a pin 16 fixed to the lever 3 and another arm 15B engaged in a slot 17 in a ratchet 19 at the inner end of the brake shoe 8. A pivotable follower 18 is mounted on the housing 13 at the outer end thereof and engages in an axial slot 20 formed in the body of friction material 12, the follower 18 serving to prevent rotation of the friction material.

In operation, the actuator 1 urges the push rod 2 rearwardly, causing pivoting of the lever 3, the latter, via the dome 3A, pushing the brake pad outwardly into engagement with the wheel. If the rotational movement of the lever 3 is excessive, due to wear of the friction material, the pin 16 on the lever 3 engages the arm 15A of the bell-crank lever 15 and the latter is rotated, and the arm 15B then picks up a fresh tooth on the ratchet wheel 19. Upon release of the actuator, the ratchet rotates the central core 9. Thus, the friction material 12 moves outwardly relative to the core 9 and the levers 3 and 15 return to their illustrated positions.

Figure 2:
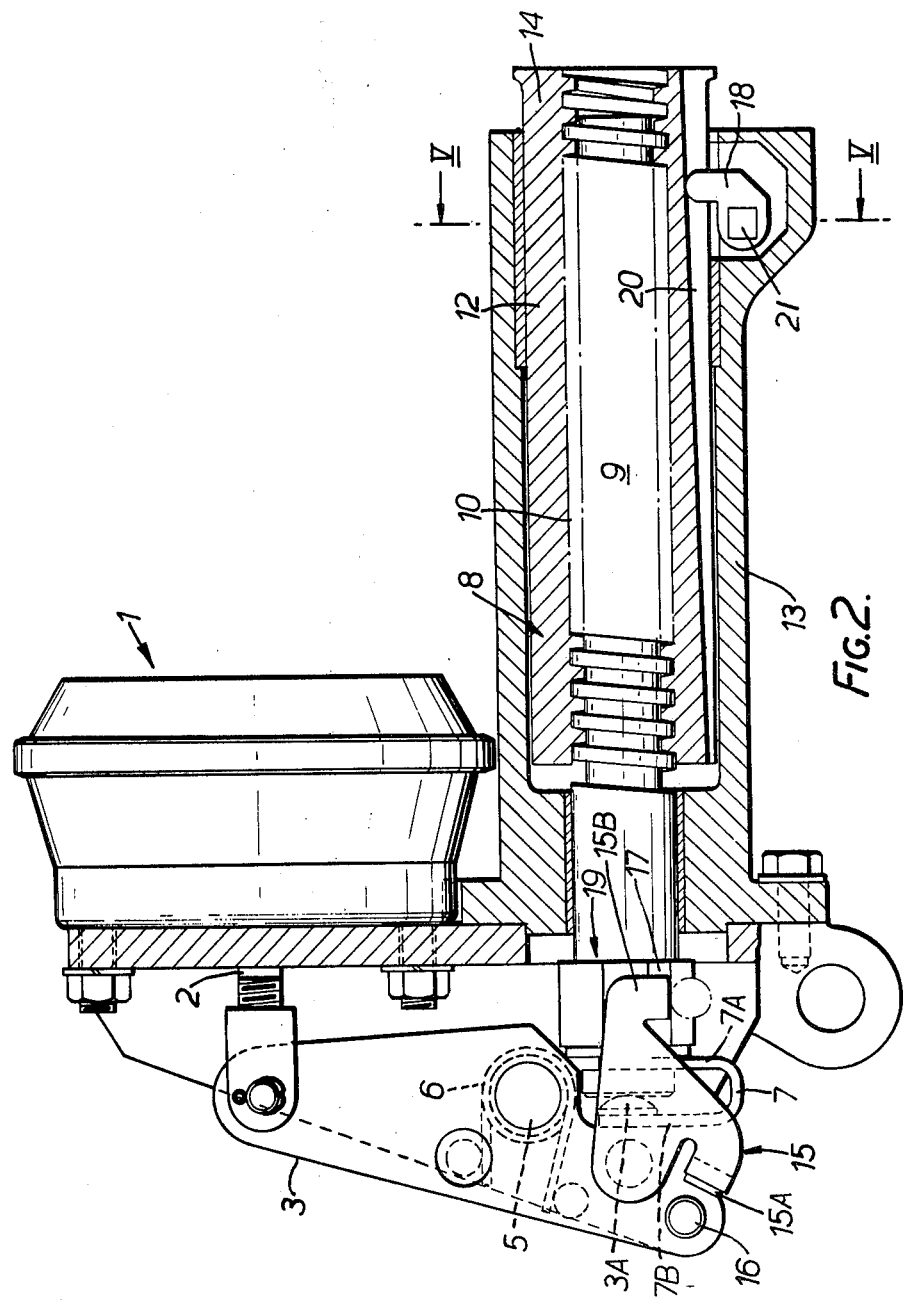
FIG. 2 is a sectional view taken on line II—II of FIG. 1.

As best seen in FIGS. 2 and 5 to 7, the follower 18 also forms part of a wear indicator mechanism. The follower 18 is non-rotatably mounted on a transverse shaft 21 on one end of which is mounted an indicator lever 22. The depth of the slot 20 decreases along the length of the friction material from the outer to the inner end thereof so that as the material wears and is moved outwardly, the follower 18 rotates (clockwise as seen in FIG. 2) and the indicator 22 moves relative to the housing 13 from a position "N" (FIG. 6) indicating an unworn pad towards a position "W" indicating a worn pad.

To replace a worn pad, the brake is pivoted to a position in which it is generally vertical by releasing a securing bolt (not shown) passing through an aperture 30 in a mounting boss 31 (FIG. 4), the securing bolt normally securing the brake to the vehicle. The remainder of the worn friction material is unscrewed from the core 9. To insert new friction material, the indicator lever 22 is manually held in its "worn" position to rotate the follower 18 away from the groove 20 in the friction material and the new friction material is screwed fully home on the core 9. The indicator lever 22 is then released and the friction material screwed outwardly until the follower 18 is aligned with and engages in the groove 22, as will be apparent by movement of the indicator lever 22 to its "normal position.

In order to ensure correct positioning of the new friction material, there is provided an aligning mechanism which comprises a lever 23 connected to the end of the transverse shaft 21 opposite to the indicator 22. At its upper end the lever 23 has a stop 24 engaging in a slot 25 formed in a slide 26. The slide is biased inwardly by a spring 27 and has therein apertures 28 (only one of which is shown in FIG. 7) through which pass respective bolts 29 (FIG. 4) which screw into threaded apertures (not shown) in the housing 13 to locate the slide 26 relative to the housing. In the normal condition of the brake the apertures 28 adopt the position shown in full lines in FIG. 7.

When a new friction pad is inserted, it will be seen that the apertures 28 cannot be aligned with the bolts 29 until the follower 18 engages in slot 20 and the indicator lever 22 is in its "normal" position. Thus, for the bolts 29 to be replaced, the slide 26, indicator lever 22 and the new pad must be correctly positioned.

Although described above as a unitary pad of friction material, it will be appreciated that the pad could be formed in a plurality of pieces, being slit axially or transversely.

I claim:

1. A vehicle wheel brake comprising an elongate part of friction material for frictionally bearing directly on a rotating member to brake the same and an adjuster having an elongate adjuster part, wherein one of said parts is hollow and the other part is located within said hollow part, and wherein said parts are axially relatively movable, one of said parts having an elongated longitudinal slot therein, and including a follower which projects into said slot to prevent rotation of said part, said slot having a base which is tapered along its length and including a wear indicator to which said follower is connected, said follower cooperating with the tapered base of said slot as the friction material part moves longitudinally to actuate the wear indicator and indicate continuously the condition of the pad from its unworn to its worn condition.

2. A brake according to claim 1, wherein said adjuster part is located within said friction material part.

3. A brake according to claim 1, wherein said parts have a screw-threaded connection.

4. A brake according to claim 1, including a device for relatively rotating said parts, when the wear of the friction material is excessive, said rotation effecting relative axial movement of said parts.

5. A brake according to claim 1, wherein said slot is formed in said friction material part.

6. A brake according to claim 1, including means for initially correctly positioning said friction material part.

7. The brake according to claim 1 wherein the elongate friction material part in its unworn condition has an axial length substantially greater than any cross sectional dimension thereof.

* * * * *